UNITED STATES PATENT OFFICE.

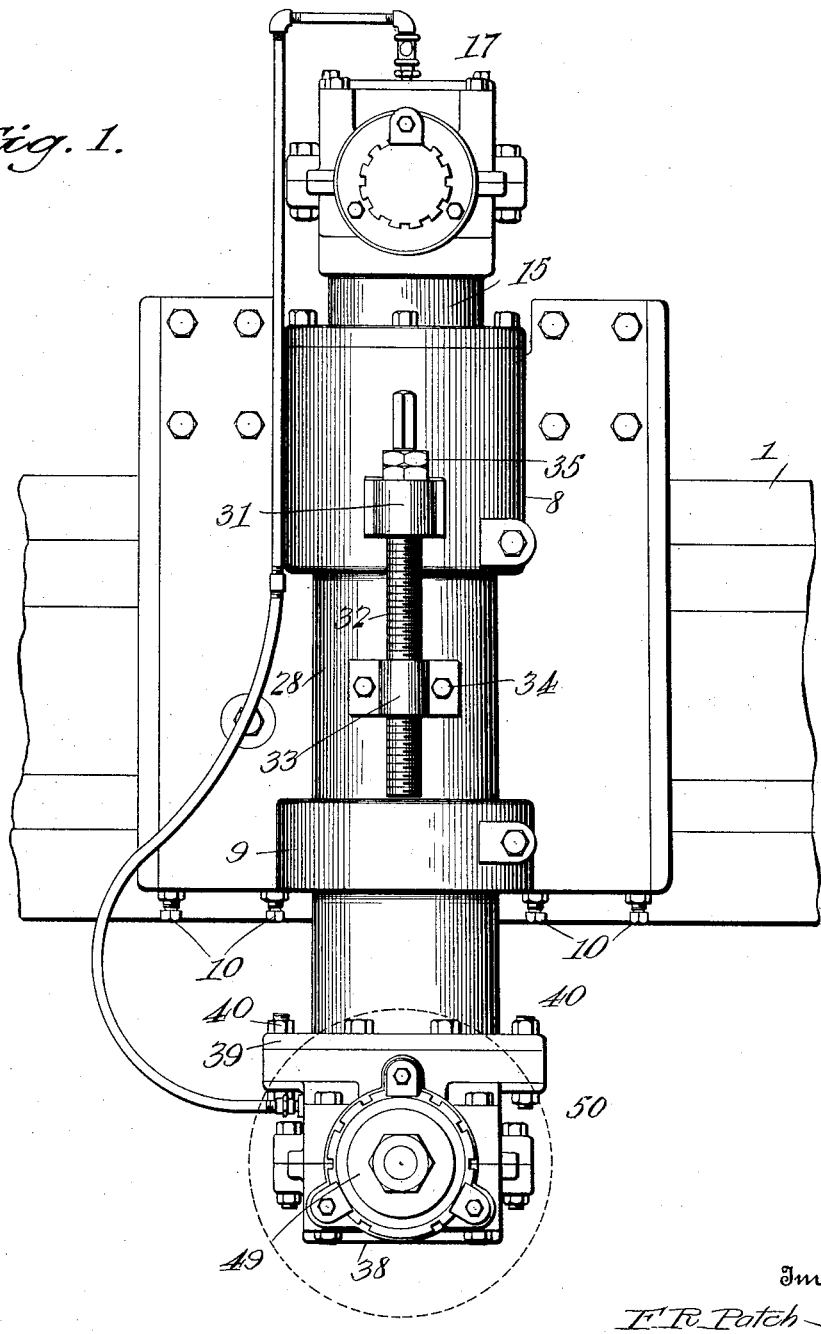

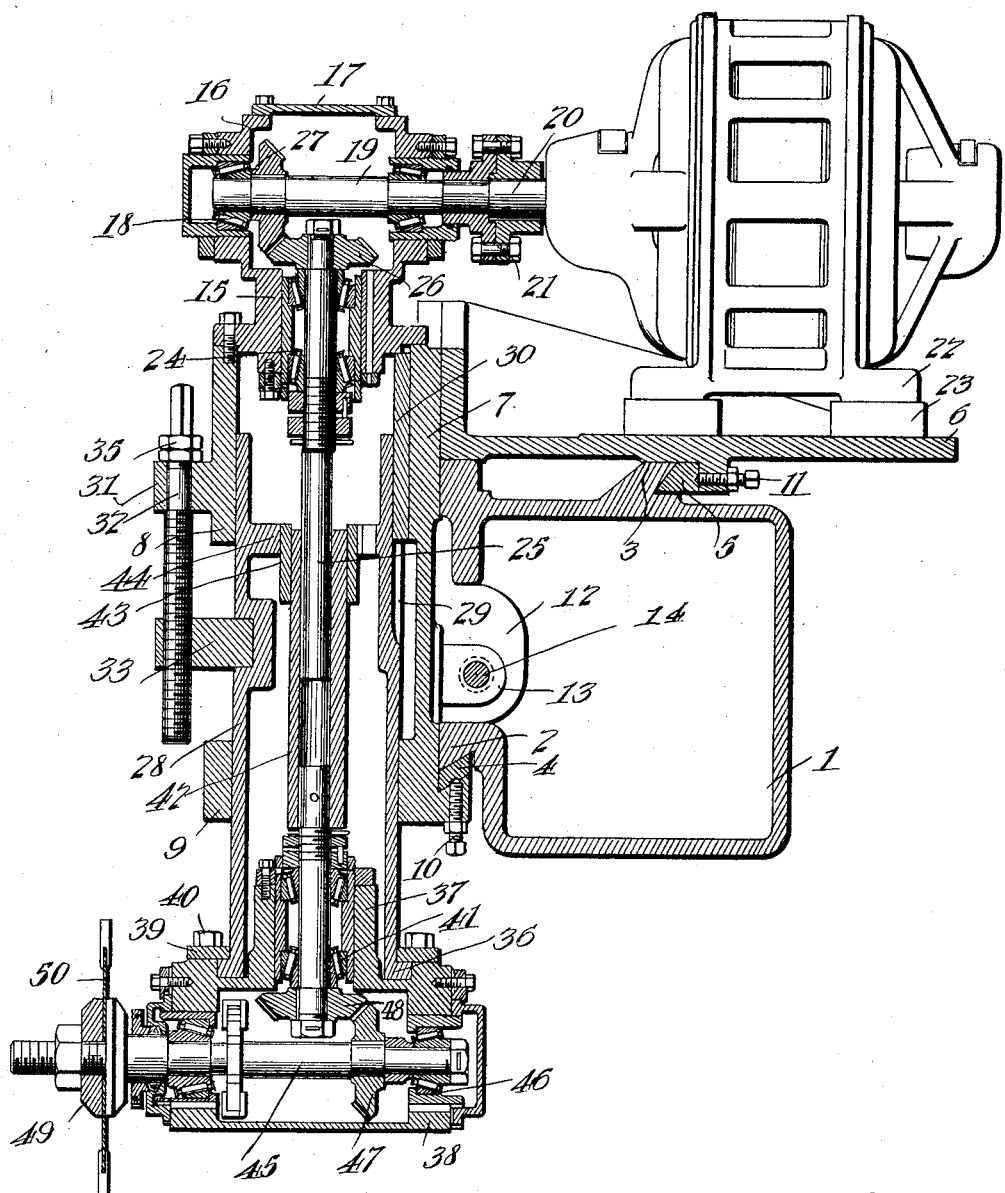

FRED R. PATCH, OF RUTLAND, VERMONT.

COPING-HEAD.

1,149,533.   Specification of Letters Patent.   Patented Aug. 10, 1915.

Application filed November 11, 1913. Serial No. 800,338.

*To all whom it may concern:*

Be it known that I, FRED R. PATCH, a citizen of the United States, residing at Rutland, in the county of Rutland and State of Vermont, have invented certain new and useful Improvements in Coping-Heads, of which the following is a specification, reference being had therein to the accompanying drawing.

This invention relates to certain new and useful improvements in coping heads for coping machines; the object being to provide a coping head with novel driving means whereby the cutter arbor can be driven directly by an electric motor carried by the carriage through the medium of beveled gears and spindle.

Another object of the invention is to provide a head with means for shifting the same in respect to the beam in order to allow the cutter to be moved in such a position that a longitudinal or transverse cut can be made in the slab on the platen.

Another and further object of the invention is to provide a head which is exceedingly simple and cheap in construction and one in which the same is so constructed that a very strong and durable head is formed; the parts being so arranged and mounted in respect to each other that they can be readily detached in order to repair the parts.

Other and further objects and advantages of the invention will be hereinafter set forth and the novel features thereof defined by the appended claims.

In the drawings—Figure 1, is a front elevation of my improved coping head showing the same in position upon the beam; the motor being omitted; and Fig. 2, is a vertical section through the head, carriage and beam; the motor being shown in elevation.

Like numerals of reference refer to like parts in the several figures of the drawings.

Referring to the drawings, 1 indicates a hollow beam of the ordinary construction adapted to span the platen; said beam having a longitudinal opening in its face as clearly shown, and the front wall and top of said beam are provided with guides 2 and 3 against which are adapted to rest bearing plates 4 and 5, as clearly shown.

Mounted upon the beam 1 is a carriage 6 which is provided with a head 7 formed of spaced tubular portions 8 and 9; the tubular portion 9 being provided with an adjusting screw 10 carrying the bearing plate 4; and the carriage 6 is provided with an adjusting screw 11 carrying the plate 5. By this manner of mounting the carriage and head upon the beam, the same is guided and allowed to move transversely thereon and to be locked in any suitable position. The head 7 is provided with an inwardly projecting portion 12 extending into the opening of the beam and carries a feed box 13 through which a feed screw 14 passes for moving the carriage upon the beam in the ordinary manner. Mounted upon the tubular portion 8 of the head 7 is a neck 15 of a housing 16 provided with a detachable cap 17; said housing being provided with suitable roller bearings 18 in which is mounted the drive shaft 19. The shaft extends outwardly through the housing at one end and is connected to a motor shaft 20 by a coupling 21, as clearly shown in Fig. 2.

An electric motor 22 is mounted upon a suitable base 23 arranged upon the carriage 6 as clearly shown in the figures in order to obtain a direct drive for the driving shaft 19 and it will be seen that this shaft is arranged in longitudinal alinement with the motor shaft 20 so that when the motor is operated, the shaft 19 will be driven smoothly in its bearings.

The neck 15 is provided with suitable roller bearings 24 in which the upper end of a spindle 25 is mounted which is provided with a beveled gear 26 meshing with a beveled gear 27 carried by the driving shaft 19. The neck 15 is preferably secured in position upon the head 7 by bolt as clearly shown, in order to allow the same to be readily detached and in order to provide means for reaching the interior of the housing 16, the cap 17 is provided.

Mounted within the tubular portions 8 and 9 of the head 7 is a trunk 28 having a groove 29 in which a key 30 carried by the head 7 extends for preventing the trunk from rotating within the head; said trunk being free to move vertically therein and in order to provide means for adjusting the trunk within the head, I provide the head with a lug 31 carrying an adjusting screw 32 which extends through a nut 33 seated in a recess formed in the trunk 28; said nut being secured therein by bolts 34 as clearly shown. By this manner of mounting the trunk within the head, the same can be adjusted vertically by operating the adjusting screw 32 and in order to provide means for locking the adjusting screw in adjusted position, I provide the screw with lock nuts 35.

The trunk 28 is provided with an annular flange 36 at its lower end which extends into an annular groove surrounding the upwardly extending neck 37 of a housing 38 and is secured within the groove by a ring 39 locked in position by bolts 40 as clearly shown in order to allow the housing to be detached from the tubular trunk when desired. The neck 37 of the housing 38 is provided with suitable roller bearings 41 in which the lower end of the spindle 25 is mounted; said spindle being inclosed by a casing 42 carried by a sleeve 43 arranged in an annular flange 44 of the head as clearly shown, and this spindle is preferably formed of sections and as herein shown, the upper section being feathered in the casing 42 and the lower section secured in the casing by a pin by means of which, the sections are slidably connected together for adjustment. The upper and lower ends are threaded in order to allow the roller bearings to be adjusted and secured in their proper positions. Arranged within the housing 38 is a cutter arbor 45 mounted in roller bearings 46 and provided with a beveled gear 47 which meshes with a beveled gear 48 secured upon the lower end of the spindle 25 in order to drive the cutter arbor when the motor is rotated through the medium of the beveled gears and spindle. It will be seen that by this manner of mounting the housing 38 in the lower end of the trunk 28, the housing is free to rotate thereon with the arbor in order to shift the arbor at any angle desired so as to make a transverse or a longitudinal cut in the slab, as will be later described.

The cutter arbor 45 is provided with a cutter clamp 49 in which is arranged a cutter 50 herein shown a carborundum wheel; said wheel being mounted thereon in such a manner that it can be readily attached or detached.

In the drawing, I have shown Timken roller bearings used and I do not make any claim for this particular construction of bearings as it is only necessary to provide suitable bearings for the driven shaft, arbor shaft and spindle in order to allow the respective members to rotate freely.

I claim:

1. In a coping machine, the combination with the cross beam thereof, of a carriage mounted to move upon said beam, a head carried by said carriage, a trunk slidably mounted in said head, means for adjusting said trunk vertically therein, means for locking said trunk therein, a cutter arbor revolubly carried by said trunk, and a motor mounted upon said carriage having a driving connection with said cutter arbor.

2. The combination with a supporting beam, of a carriage mounted to move upon said beam, a tubular head carried by said carriage, a trunk vertically adjustable within said head, a housing mounted upon said head, a housing revolubly mounted upon said trunk, a cutter arbor mounted in said last-mentioned housing, a driving shaft mounted in the first-mentioned housing, a driving connection arranged within said trunk between said driven shaft and cutter arbor, and a motor mounted upon said carriage having a shaft connected to said driven shaft.

3. In a coping machine, the combination with the horizontally disposed cross beam thereof, of a carriage movably mounted upon said beam, a vertically disposed hollow head projecting laterally from said carriage, a trunk mounted to move vertically in said head, means for adjusting said trunk vertically therein, a horizontally disposed housing revolubly mounted upon the lower end of said trunk, a horizontally disposed cutter arbor mounted in said housing, and a motor mounted upon said carriage having a driving connection with said cutter arbor.

4. A coping head for coping machines comprising a tubular body, a trunk slidably mounted in said body, means for preventing said trunk from revolving within said body, a nut carried by said trunk, an adjusting screw carried by said body extending through said nut, a housing carried by said head, a second housing revolubly supported by said trunk, a cutter arbor mounted within said last-mentioned housing, a driving shaft arranged within the first-mentioned housing, beveled gears carried by the driving shaft and cutter arbor, and a spindle having coöperating gears at its ends meshing with said gears.

5. A coping head for coping machines comprising a tubular head, a housing fixed upon said head, a driving shaft arranged within said housing, a beveled gear carried by said driving shaft, a trunk slidably mounted within said tubular head, means for adjusting said trunk vertically within said head, means for preventing rotation of said trunk within said head, a housing revolubly supported on the lower end of said trunk, a cutter arbor mounted in said housing, a beveled gear carried by said cutter arbor, and a spindle extending through said trunk and head having beveled gears at its ends meshing with the beveled gears of said driving shaft and cutter arbor.

6. In a coping machine, the combination with a supporting beam, of a carriage slidably mounted upon said beam, a tubular head carried by said carriage, a motor mounted upon said carriage having a shaft, a trunk slidably mounted within said head, a housing revolubly mounted upon the lower end of said trunk, a cutter carried by said housing, and a driving connection between said cutter and motor shaft.

7. A coping head comprising a tubular body having a groove, a trunk slidably mounted within said body having a registering groove, a key arranged within said groove for preventing rotary movement thereof, said trunk having an annular flange at its lower end, a housing having a groove to receive said flange, a ring carried by said housing extending over said flange, and means for adjusting said trunk vertically within said head.

8. In a coping machine, the combination with the supporting beam thereof, of a carriage slidably mounted upon said beam, a motor carried by said carriage, a head extending from said carriage, a trunk slidably mounted within said head, a housing revolubly supported on the lower end of said trunk, a cutter carried by said housing, and a beveled gear driving connection between said cutter and said motor.

9. A coping head for coping machines comprising a tubular body, a lug formed on said body, a trunk slidably mounted within said body, a nut carried by said trunk in alinement with said lug, an adjusting screw revolubly mounted in said lug extending through said nut, said trunk having an annular flange at its lower end, a housing provided with a groove to receive said flange, a ring fixed on said housing extending over said flange, a cutter carried by said housing, and a motor mounted upon said carriage having a beveled gear driving connection with said cutter.

10. In a coping machine, the combination with the supporting beam thereof, of a carriage slidably mounted upon said beam, a head extending from said carriage, a housing fixed on said head, a trunk adjustably mounted within said head, a housing revolubly supported by said trunk, roller bearings mounted within said housings, a driving shaft mounted in the roller bearings of the upper housing having a beveled gear, a cutter shaft mounted within the roller bearings of the lower housing having a beveled gear, a spindle extending through said trunk and head mounted in roller bearings thereof, coöperating beveled gears carried by said spindle, and a motor arranged upon said carriage having a motor shaft in alinement with the driven shaft and detachably connected thereto.

11. In a coping machine, the combination with a hollow supporting beam having an opening in the face thereof, of a carriage slidably mounted upon said beam, a head carried by said carriage having a projection extending into the opening of said beams, a tubular trunk slidably mounted within said head, means for adjusting said trunk within said head, means for preventing rotary movement of said trunk within said head, a revolubly mounted housing carried by said trunk, and a cutter arbor mounted in said housing having a cutter clamp at one end.

12. In a coping machine, the combination with the cross beam thereof, of a carriage mounted to move upon said beam, a head carried by said carriage, a trunk adjustably mounted in said head, a housing revolubly mounted upon the lower end of said trunk, means for locking said housing in adjusted position, a cutter arbor mounted in said housing, and a motor mounted upon said carriage having a driving connection with said cutter arbor.

In testimony whereof I affix my signature in presence of two witnesses.

FRED R. PATCH.

Witnesses:
GEO. C. COBB,
AGNES E. GILSON.

Copies of this patent may be obtained for five cents each, by addressing the "Commissioner of Patents, Washington, D. C."